Dec. 12, 1933.   A. SCHMID   1,939,634
APPARATUS FOR THE CONTINUOUS SEPARATION AND AFTER SEPARATION
OF NITROGLYCERINE AND RESIDUARY ACID
Original Filed July 18, 1929
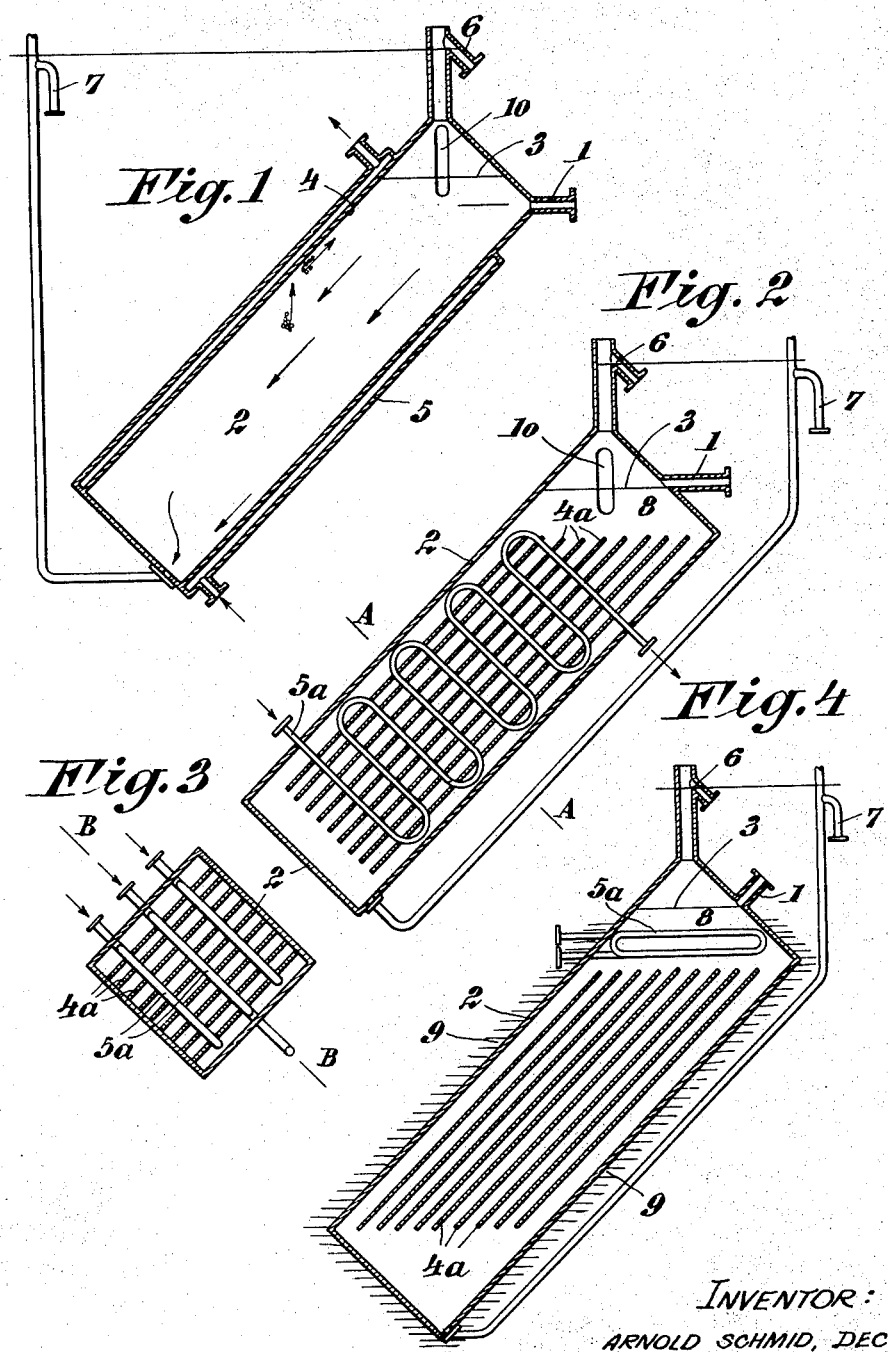
INVENTOR:
ARNOLD SCHMID, DEC'D., BY
HANS SCHMID & IRMA SCHMID,
ADMINISTRATORS Patented Dec. 12, 1933

1,939,634

UNITED STATES PATENT OFFICE 1,939,634

APPARATUS FOR THE CONTINUOUS SEPARATION AND AFTER SEPARATION OF NITROGLYCERINE AND RESIDUARY ACID

Arnold Schmid, deceased, late of Judendorf-Strassengel, Styria, Austria, by Hans Schmid and Irma Schmid, administrators, Judendorf-Strassengel, Austria Original application July 18, 1929, Serial No. 379,293, and in Germany July 30, 1928. Divided and this application October 30, 1930. Serial No. 492,347

3 Claims. (Cl. 23—266)

This invention relates to an apparatus for the continuous preliminary separation and after separation of nitroglycerine and residuary acid.

In the known apparatus in spite of the arrangement of perforated distributing plates, the emulsion of nitroglycerine and residuary acid immediately on its admission ascended, on account of its lightness, in the heavier acid-charge and passed through the vessel between the uppermost plates, while the heavier acid remained in the bottom part of the separator and did not circulate.

In this way only a part of the separating receptacle is actually utilized for the process of separation, while in the other part of the separator the residuary acid constitutes an unnecessary charge only, and consequently the separation carried out in an apparatus of this known kind is very unsatisfactory and the discharged residuary acid thus contains much more nitroglycerine in suspension than would be the case if the liquid actually had been distributed over the whole receptacle. In view thereof it has been necessary to carry out the preliminary separation and also the after separation in separate apparatuses, so that the said separator has been employed for the after separation only. In this event better results were obtained, because such a great difference in the specific weight of the supplied liquid and the discharged did no longer exist, but also in this case the process was not quite satisfactory.

Small differences of the liquids arose namely by differences of temperature and again influenced the course of the circulation in an undesirable manner. When the warmer residuary acid entered the colder after separator, the admitted acid ascended immediately and displaced only the top half of the charge of the receptacle, while the bottom half still remained unchanged. When the colder residuary acid entered the warmer after separator the opposite action took place of course, namely the heavier cold acid descended immediately to the bottom and displaced only the bottom half of the contents of the apparatus.

All these drawbacks are avoided according to the present invention in that the principle of the horizontal flow of the acid in the separator is replaced by the principle of the inclined flow of the acid. The entering residuary acid always will be warmer than the residuary acid leaving the separator, if the nitrating temperature is so high, that it always lies above the temperature of the chamber in which the separation is carried out or if the separator is provided with a cooling arrangement (jacket or coil) so that its temperature always is lower than the nitrating temperature. Now if the acid flows through the separator not horizontally but from top to bottom, it is quite certain that the warmer and thus lighter acid cannot descend to the discharge opening located at the lowermost place of the apparatus without displacing the colder and thus heavier acid. In this way the acid-current is distributed over the whole cross-sectional area of the separator without the necessity of mechanical means such as sieves and the like.

According to this invention, the separation and after separation is carried out in a single apparatus, whereby however an increase in density takes place during the separation as well as during the cooling of the acid, which does not necessitate a vertical flow from top to bottom.

Several modes of carrying out the present invention are illustrated diagrammatically and by way of example on the accompanying sheet of drawing in which:—

Fig. 1 shows an apparatus in longitudinal section.

Figs. 2 and 3 show a modified construction of the apparatus in longitudinal section and transverse section respectively.

Fig. 4 is a longitudinal section of a still further modified construction.

In the apparatus shown in Fig. 1, the emulsion consisting of nitroglycerine and residuary acid is admitted into the receptacle 2 by way of an inlet pipe 1. The mixture is heavier than the nitroglycerine located at the top and lighter than the residuary acid disposed at the bottom and therefore immediately distributes itself at the zone of separation 3 in the form of a horizontally disposed layer. During the downward flow of the acid, the drops of nitroglycerine rise therefrom, are separated at the top wall 4 of the receptacle and thereupon slide upward. The acid gradually becomes heavier owing to the loss of nitroglycerine and the cooling action of a cooling jacket 5. Thus always a lighter layer rests on a heavier layer, so that a uniform flow or circulation is safeguarded. The overflow pipe 6 for the nitroglycerine and the overflow pipe 7 for the acid have such relative heights that the separation-level remains at 3, an observation window 10 being provided at this height and the separated nitroglycerine and the residuary acid automatically leave the apparatus.

The cooling jacket can be dispensed with if the temperature of the room is lower than the temperature of the incoming emulsion. On the other hand, the said cooling jacket can be replaced by an interior cooling coil or by a thermic insulation of the receptacle. The apparatus may be provided with plates in known manner. An arrangement of this kind is shown in Fig. 2 in longitudinal section along line B—B of Fig. 3, and in Fig. 3 in transverse section along line A—A of Fig. 2. It is new to arrange the plates 4ᵃ at a gradient of between 30 and 60 degrees. The slope is now in the direction of flow of the liquid and not vertically thereto as heretofore. In this way the acid passes between the plates during its descent.

Compared with the well known constructions, the greater gradient of the plates of the apparatus herein set forth possesses the further advantage, that the nitroglycerine slides upward along said plates quicker so that sediments cannot collect on the plates, because they would slide off owing to gravity and be carried out of the apparatus by the residuary acid. The plates may be corrugated or grooved on the under side, as is already the case in known constructions, in order that the drops of nitroglycerine more readily combine and rise.

A further novel feature of this construction consists in the arrangement of an empty space 8 above the plates 4ᵃ which serves as preliminary separator, because in this space the greater part of the nitroglycerine is separated from the emulsion, so that only a very small part thereof passes with the acid between the plates. This possesses the advantage, that the process of separation and the separation-level can be watched through a window 10 and the emulsion is distributed over the entire cross sectional area of the receptacle. Otherwise the apparatus works in the same way as it has been described with reference to Fig. 1.

The coils may be dispensed with under certain circumstances. Also their number and arrangement may be varied, but care is to be taken, that the entire area of the receptacle is uniformly cooled. If some layers between the plates are more cooled than other layers, the downward flow will be accelerated in the colder layers owing to the increasing density of the acid, so that the uniformity of flow and thus the good effect of the separator are lost again.

Compared with the arrangement shown in Figs. 2 and 3, the apparatus shown in Fig. 4 differs in the arrangement of the coil and possesses the advantage of simple construction. In this arrangement the coil 5 is located in the upper preliminary separation space 8 and uniformly cools the whole area of the receptacle. However it is necessary to line the receptacle 2 against absorption of heat by an insulating material 9, in order that upwardly directed currents may not arise at the walls in consequence of heating, which would result in too rapid movement of the suspended nitroglycerine present in the middle of the apparatus. Otherwise the operation of the apparatus is the same as in the construction according to Fig. 1.

This application is a division of co-pending application No. 379,293, filed July 18, 1929.

We claim:—

1. Apparatus for preliminary and final separation of nitroglycerine residual acid, comprising a vessel inclined towards the horizontal, and provided with an inlet near its top for said acid, means adapted to control the temperature in said vessel, thereby keeping the upper part of said vessel and the liquid therein warmer and therefore of less gravity than the cooled middle and lower part in order to separate the nitroglycerine in said upper part while keeping the liquid in the middle and lower part of said vessel cooler and therefore of greater gravity than in the upper part, in order to compel the residual acid separated from the nitroglycerine to descend, a standpipe at the bottom of said vessel for discharging the separated acid and a take-off pipe at the uppermost point of the vessel for the nitroglycerine.

2. Apparatus in accordance with claim 1, having ribbed plates parallel to the longitudinal walls of the separating vessel providing a separating chamber in the upper part of the separation vessel, and a cooling chamber for the residual acid in the lower part of the vessel, causing the residual acid becoming constantly heavier to descend along said plates, while nitroglycerine ascends.

3. Apparatus for the separation of nitroglycerine residual acid in accordance with claim 1 in which a heat insulating mass is provided around the separation vessel thereby protecting it against the influence of external heat.

HANS SCHMID,
IRMA SCHMID,
*Administrators of Arnold Schmid, Deceased.*